United States Patent [19]

Kraski

[11] Patent Number: 5,163,381
[45] Date of Patent: Nov. 17, 1992

[54] PET PLAY PEN

[76] Inventor: Dulcyne Kraski, 2309 Primrose St., Pittsburgh, Pa. 15203

[21] Appl. No.: 863,336

[22] Filed: Apr. 2, 1992

Related U.S. Application Data

[63] Continuation of Ser. No. 740,518, Aug. 5, 1991, abandoned.

[51] Int. Cl.$^5$ ............................................. A01K 29/00
[52] U.S. Cl. ................................ 119/29; 229/120.18; 119/19
[58] Field of Search .................... 119/29, 29.5, 15, 17, 119/19; 229/178, 167, 120.18

[56] References Cited

U.S. PATENT DOCUMENTS

| | | | |
|---|---|---|---|
| 1,130,818 | 3/1915 | Herman | 119/61 |
| 2,233,221 | 2/1941 | Oliver | 229/120.18 |
| 2,296,000 | 9/1942 | Ojalvo | 119/29 |
| 2,346,001 | 4/1944 | Bate | 119/17 |
| 2,894,672 | 7/1959 | Bamburg | 229/120.18 |
| 4,058,249 | 11/1977 | Buck | 229/120.18 |
| 4,177,761 | 12/1979 | Bellocchi | 119/29 |
| 4,368,690 | 1/1983 | Tenzer | 119/15 |

Primary Examiner—John G. Weiss
Attorney, Agent, or Firm—Armstrong & Kubovcik

[57] ABSTRACT

A pet play pen has a main, open-top compartment and a secondary, substantially fully enclosed compartment within which a pet's toy is flexibly suspended from a top wall of the enclosed compartment and is accessible from at least the open-top compartment by insertion of the pet's paw through apertures in a wall separating the open-top and the enclosed compartments.

8 Claims, 2 Drawing Sheets

PET PLAY PEN

This application is a continuation of application Ser. No. 07/740,518 filed Aug. 5, 1991, now abandoned.

FIELD OF THE INVENTION

This invention relates to containers serving as a play pen and sleeping box for pets, especially cats.

BACKGROUND OF THE INVENTION

Although many existing forms of boxes are adapted as sleeping boxes for pets such as cats and small dogs, such boxes do not provide means for keeping the attention of such pets which are naturally inquisitive and playful. The present invention provides a combination box serving not only as a sleeping box for pets, but also has a separate compartment in which is suspended a suitable toy of limited accessibility from a main compartment which can serve as a sleeping box.

DETAILED DESCRIPTION OF THE INVENTION

Figure 1:
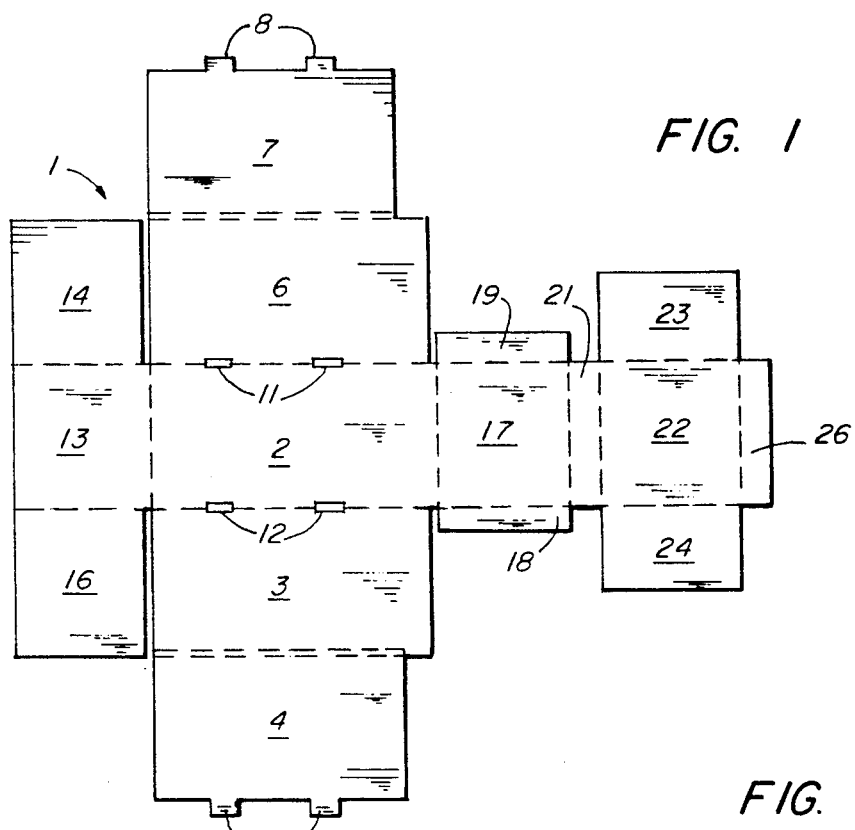
FIG. 1 is a plan view of a box blank or parison from which the pet pen of the invention is assembled.

The blank of FIG. 1, denoted generally by the numeral 1, is formed of any suitable material, such as, for example, corrugated paper board or plastic, and comprises a main or open compartment bottom panel 2 hingedly connected along creases in the blank material to a first open compartment front side panel 3 and a first open compartment back panel 6. Panel 3 and 6 are connected, respectively, along crease lines in the blank material, to a second open compartment front panel 4 and a second open compartment back panel 7.

Panels 4 and 7 are provided, respectively, with a first pair of securing tabs 8 and a second pair of securing tabs 9. Tabs 8 and 9 are insertable, respectively, within a first pair of securing slots 11 and a second pair of securing slots 12. Slots 11 and 12 are formed in the blank material along the crease lines joining, respectively, panels 2 and 6 and panels 2 and 3.

Main, open compartment, bottom panel 2 is joined, at one end thereof, along a crease line in the blank material, to a first open compartment end panel 13.

Panel 13 in turn is joined, along crease lines in the blank material, to a second open compartment end panel 14 and a third open compartment end panel 16.

At the other end of main (open) compartment bottom panel 2 that panel is joined, along a crease line in the blank material, to a closed compartment outside end panel 17. At an opposite, parallel edge of panel 17, that panel is joined, along crease lines in the blank material, to a closed compartment top panel 21. The other two opposed and parallel edges of panel 17 are respectively joined, along crease lines in the blank material, to a closed compartment front panel 18 and a closed compartment back panel 19.

The closed compartment top panel is hingedly joined, along a crease line in the blank material, to a closed compartment inside end panel 22. The opposite, parallel edge of panel 22 is connected, along a crease line in the blank material, to a closed compartment bottom panel 26. The other two opposed and parallel edges of panel 22 are connected, respectively, to a back flap 23 and a front flap 24.

Figure 2:
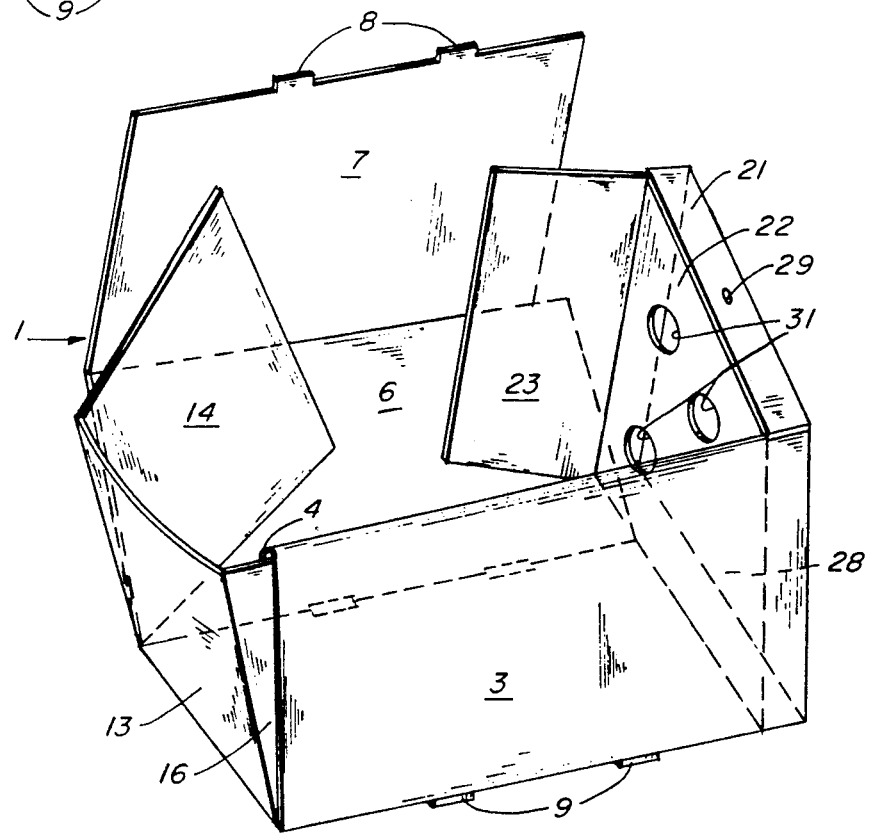
FIG. 2 is an isometric view of a partially assembled pet pen.

In the partially assembled pet play pen of FIG. 2 a compartment 28 is shown as formed by panels 17-19, 21, 22, flaps 23 and 24 and panel 26.

In assembling the play pen, the first main end panel 13 is folded upwardly about the crease line between that panel and the bottom panel 2. The second and third main end panels are folded inwardly of the play pen as shown in FIG. 2, thereby forming reinforcing front and side wall members of the main compartment of the play pen. The portion of the blank consisting of panels 17-19, 21, 22, flaps 23 and 24 and panel 26 is folded upwardly along the crease line between panels 2 and 17. Compartment end panels 18 and 19 are folded inwardly to form the front and back walls of the enclosed compartment 28. Panel 21 is folded inwardly and downwardly along the crease lines between that panel and panels 17 and 22 whereby panel 21 forms the top panel of the enclosed compartment 28, panel 22 forms the inside end panel of compartment 28 and panel 17 forms the outside end panel of compartment 28. At the same time, the front and back flaps 24 and 23 are folded inwardly to form (along with panels 14 and 16) reinforcing front and back wall members for the open compartment of the play pen. Panel 26 is folded inwardly to form the bottom of the enclosed compartment 28. As also shown in FIG. 2, the second open compartment front panel and the second open compartment back panel are then folded inwardly and downwardly to form further reinforcing open compartment front and back wall members. These panels are locked into place by insertion of securing tabs 8 and 9 in, respectively, securing slots 11 and 12. The tight-fitting panels 4 and 7 also secure in place the several panels forming the enclosed compartment 28. As further shown in FIG. 2, the enclosed compartment inside end panel 22 is provided with a number of holes 31 for insertion therein of the paw of a pet. Enclosed compartment top panel 21 is provided with a small aperture 29 to accommodate a fixture or fastener for suspending a pet's toy within enclosed compartment 28.

Figure 3:
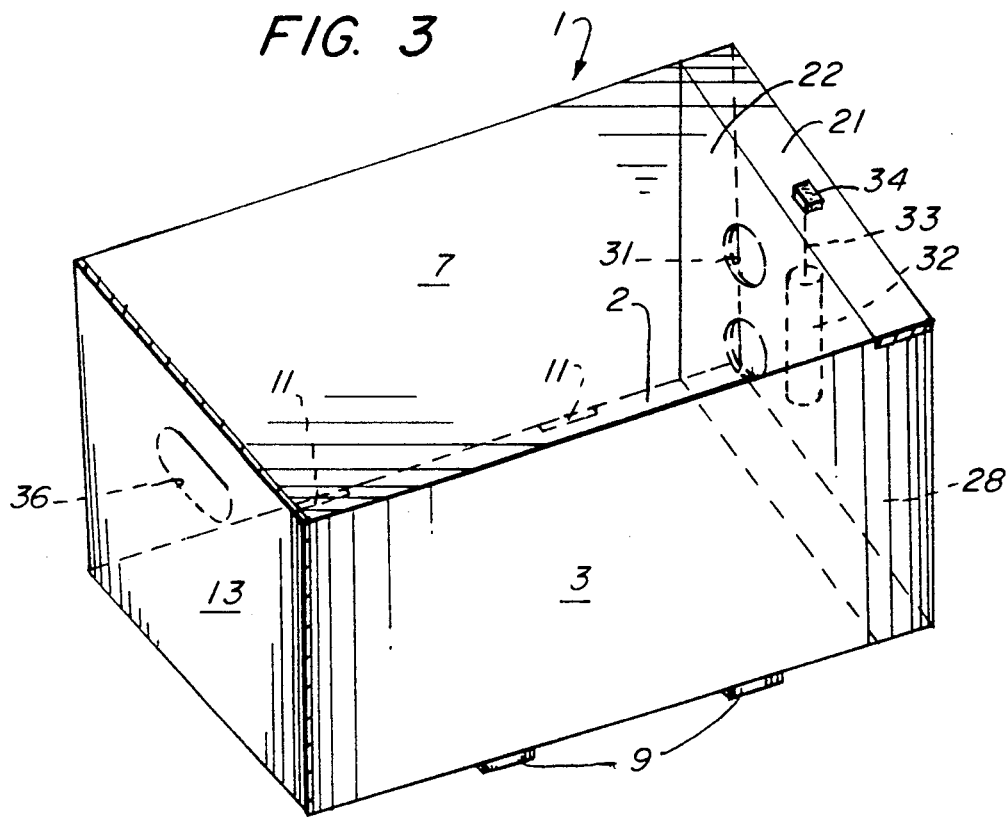
FIG. 3 is an isometric view of the assembled pet pen of this invention having an open compartment portion and a closed compartment portion.

FIG. 3 shows a fastener 34 in the aperture 29 and affixed to a suspension means 33 suspending a toy 32 within enclosed compartment 28 within reach of the pet's paw inserted through holes 31.

The pet play pen 1 may be provided with punch-out hand grips 36 for convenience in handling the pen. Such punch-out hand grips are formed in the blank material of panels 13 as shown in FIG. 3 and in panel 17. Other suitable handle means could be provided as known in the art.

The provision of a suspended toy 32 in compartment 28 provides an effective means for obtaining and keeping the attention of a small pet. Such attention-getting means keeps the pet occupied and, since access is only through the open compartment of the play pen, the latter becomes an attractive sleeping place for the pet. If desired, holes also can be provided in panel 17 for toy access by the pet from the outside of the play pen.

Also, if desired, portions of the side panels of the main compartment of the play pen may be cut out for additional ventilation.

Figure 4:
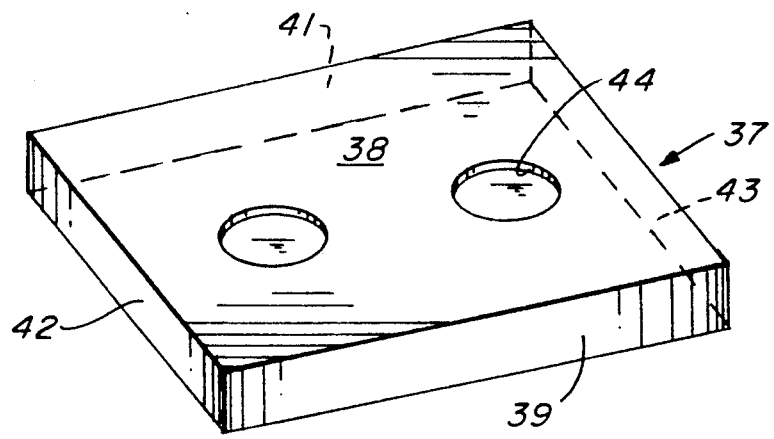
FIG. 4 is an isometric view of a cover for the play pen.

By providing a suitable cover for the play pen, it can serve as a convenient transportation container for the pet, while keeping the pet occupied and less prone to excitement and injury during transportation. FIG. 4 shows a simple cover, denoted generally by the numeral 37, comprising a flat top cover panel 38 and, depending therefrom a skirt consisting of a front cover panel 39, a back cover panel 41, a first cover end panel 42 and a second cover end panel 43. For shipping the covered container, the cover 37 can be secured to the pen 1 by strips of adhesive material or other suitable means. Holes 44 can be provided for ventilation. Other forms of covers could be used.

What is claimed is:

1. A pet play pen comprising a first, open top main compartment for accommodating a pet, said first compartment having a closed bottom and four side walls, a second, enclosed compartment having a bottom in the same plane as the bottom of the first compartment, a closed top wall and four side walls, one of which side walls forms a common side wall with the first compartment, the side wall common to the first and second compartments having an aperture formed therein of a size sufficient to allow access therethrough into the second compartment of a paw of a pet in the first compartment while preventing further access of the pet to the second compartment, and a pet toy flexibly suspended from the top wall of the second compartment in a manner such that the toy can be reached by a pet's paw inserted through the aperture in the common wall separating the first and second compartments 2. The combination of a play pen according to claim 1 and a removable cover thereby adapting the play pen as a pet travel container.

3. A blank for assembly of a pet play pen made of a flat piece of creasable stock comprising:
   a. an open compartment bottom panel;
   b. the open compartment bottom panel being hingedly connected along opposed parallel first and second edges thereof by crease lines in the blank material to a first open compartment front panel and a first open compartment back panel;
   c. said first and second open compartment front and back panels being respectively hingedly connected to a second open compartment front panel and a second open compartment back panel provided, respectively, with a first pair of securing tabs and a second pair of securing tabs insertable, respectively, within a first pair of securing slots and a second pair of securing slots formed in the blank material along crease lines joining the open compartment bottom panel with, respectively, the first open compartment back panel and the first open compartment front panel;
   d. a first open compartment end panel hingedly connected to a third edge of the open compartment bottom panel;
   e. second and third open compartment end panels hingedly connected to opposed parallel edges of the first open compartment and panel;
   f. a closed compartment outside end panel hingedly connected along a first pair of opposed parallel edges thereof with, respectively, a fourth edge of the open compartment bottom panel and a closed compartment top panel and along a second pair of opposed parallel edges thereof with, respectively, a closed compartment front panel and a closed compartment back panel a closed compartment outside end panel having a first pair of opposed parallel edges with one of the first pair hingedly connected to a fourth edge of the open compartment bottom panel and the other of the first pair of parallel edges connected to a closed compartment top panel, a second pair of opposed parallel edges on the closed compartment outside end panel, respectively connected to a closed compartment front panel and a closed compartment back panel, and
   g. the closed compartment top panel being hingedly connected to a first edge of a closed compartment inside end panel, a second, opposed and parallel edge thereof being hingedly connected to a closed compartment bottom panel and the other two opposed and parallel edges of the closed compartment inside end panel being hingedly connected, respectively, to an open compartment back wall-reinforcing back flap and an open compartment front wall-reinforcing front flap.

4. A play pen assembled from a blank according to claim 3.

5. A play pen according to claim 4, wherein the closed compartment inside end panel has apertures therein for insertion therethrough of a pet's paw.

6. A play pen according to claim 5, wherein a toy is flexibly suspended within the enclosed compartment.

7. A play pen according to claim 5, wherein the first open compartment end panel and the enclosed compartment outside end panel have openings therein forming hand grips for handling the play pen.

8. A pet travel container comprising a pet play pen according to claim 7 and a cover over the open compartment.

* * * * *